Patented July 10, 1951

2,560,119

UNITED STATES PATENT OFFICE 2,560,119

TETRAHYDROPHTHALIC ANHYDRIDE RESINS

John W. McCaslin and John C. Hillyer, Bartlesville, Okla., assignors to Phillips Petroleum Company, a corporation of Delaware No Drawing. Application November 21, 1947, Serial No. 787,472

11 Claims. (Cl. 260—78.4)

This invention relates to resinous polymeric materials. In one aspect this invention relates to novel resinous materials prepared from dibasic acid anhydrides. In another aspect this invention relates to resinous materials and a method for their preparation from tetrahydrophthalic acid anhydride or substituted products thereof.

This invention has as an object to provide novel resinous materials of varying physical properties.

Another object is to provide novel resinous materials derived from an anhydride such as might comprise a condensation product of maleic acid anhydride and a compound having a system of conjugated C=C double bonds.

A further object is to provide novel resinous materials especially suitable for use as adhesives, coatings, compositions, floor coverings, etc.

Still another object is to provide a method for the preparation of novel resinous materials from tetrahydrophthalic acid anhydride or derivatives thereof.

Other objects and advantages of this invention will become more apparent to one skilled in the art, from the accompanying disclosure and discussion.

The resinous materials of this invention are prepared from tetrahydrophthalic acid anhydride, or from such derivatives thereof as are in accordance with the following formula:

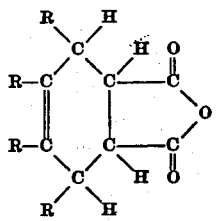

where each R stands for one of the group consisting of hydrogen, halogen, and alkyl with not more than two R's being halogen and with not more than thirteen carbon atoms per molecule of anhydride. The aforedescribed starting compound is referred to hereinafter as the anhydride since the invention is concerned in all instances with materials prepared therefrom. The product of our invention is referred to as the resinous polymer product or resinous product.

We have found that novel resinous polymers can be prepared by heating the above described anhydrides. However, a mere application of heat to the anhydride as a means for controlled preparation is inadequate since it is necessary to regulate temperature and time conditions in order to produce any one of the desired novel materials.

The method of one preferred embodiment of this invention comprises heating the anhydride at its boiling point, polymerizing a portion of same thereby, and simultaneously distilling unpolymerized anhydride from the polymer-containing mixture, said mixture comprising herein the anhydride material initially heated and the portion thereof subsequently polymerized. By the employment of our invention we have discovered that novel resinous materials of varying properties and applications can be prepared. For example, we have found that holding the boiling mixture under total reflux, i. e. returning the condensed vapors distilled therefrom to the said mixture, for a period prior to the distillation, a product is produced which is darker in color and which in some instances becomes hard and brittle upon completion of the aforesaid distillation. The desired resinous product obtained as the distillation residue can be further heated to yield a product of increased hardness and in some cases lighter in color. The resinous product can be hydrogenated to produce a resinous material considerably harder than those mentioned heretofore. Our invention can be used with any one of the above mentioned modifications or embodiments, with all or a combination thereof or independently as depends upon the specific type of novel resinous polymer product sought.

Heating and thereby polymerizing the anhydride at its boiling point, comprises a means of conducting the polymerization at a controlled temperature, which gradually and regularly increases as the distillation progresses, as a function of the regularly decreasing concentration of the lower boiling component in the polymer-containing mixture. We have found that the rate of distillation of the unpolymerized anhydride from the polymer-containing mixture can be closely controlled so as to effect a desirable time-temperature balance for our reaction.

We have found that when employing tetrahydrophthalic anhydride as the anhydride, initial temperatures in the distillation kettle, herein comprising the reaction zone, approximate 520–550° F., gradually increasing as aforesaid to as high as 800° F., and that vapor distillate temperatures usually vary in the range of 515-530° F. If other starting materials are used, the distillation temperature will obviously be fixed thereby. We prefer to conduct the distillation over a period of at least one hour, extending often to as long as 3 or 4 hours. Temperatures referred to herein are those observed at atmospheric pressure.

In the practice of our invention the anhydride is heated at its boiling point and a portion thereof polymerized, and the remaining unpolymerized portion is simultaneously distilled from the polymer-containing mixture, terminating thereby a cycle in our invention. The distillate thereof, comprising an unpolymerized portion, is reheated at the boiling point and is partially polymerized thereby, and the unpolymerized portion of the polymer-containing mixture is simultaneously distilled therefrom, thereby terminating a second cycle. The step or cycle is repeated, if desired, until the anhydride initially heated is substantially completely polymerized to the specific product sought. In each step or cycle, a portion usually in the range of 20–70 per cent by weight of the initial anhydride is polymerized to a resinous polymer product of our invention.

Our purpose in employing such a stepwise polymerization-distillation is to substantially completely polymerize the anhydride initially heated under the conditions of time and temperature required for preparation of the specific resinous product sought. The method provides for removal of the residual resinous product of each step or cycle, providing thereby a further means of controlling contact time of the polymerization, and still polymerizing substantially all the anhydride initially heated. In some instances several distillations are necessary depending upon the specific anhydride and the specific type resinous product sought. The resinous product of each step as aforesaid can be utilized or can be further treated separately or in combination with the residual product of another, several or all the steps of our stepwise method.

It is to be understood that a polymerization of the anhydride to obtain the novel resinous products of our invention can be effected by any other means so long as the conditions of time and temperature are controlled to produce the specific type resinous product sought. For example, our stepwise distillation method is employed to maintain a reaction at controlled conditions of time and temperature as mentioned hereinbefore; however, if the reaction temperature were to be maintained constant by placing the reaction vessel in a constant temperature bath, and a contact time of a corresponding duration were employed, a satisfactory product would be obtained even though a closed vessel were used. In such cases, the system would sometimes necessarily be under pressures in excess of 1 atmosphere, in order to maintain the liquid phase. Another method is to pass a continuous stream of charge stock through a long tube coil, wherein it is heated to the desired reaction temperature. The flow rate is adjusted to result in the desired reaction time and extent of reaction. Effluents of the tube coil are passed to separating means, wherein the resin product is recovered and unreacted material may be separated and recycled.

Our invention can be modified in several respects as regards the type of resinous product obtained and is more fully described in the light of such modifications hereinafter. The invention is successfully conducted in the absence of catalysts, but condensation catalysts can, at times, be employed to advantage.

The properties of the novel resinous products of our invention are dependent not only on the particular anhydride and the control of time and temperature provided by our stepwise distillation method, but also upon supplementary control of time and temperature conditions as provided by various modifications of our invention, such as, for example, holding the boiling mixture under total reflux prior to the distillation of the unpolymerized portion therefrom, prolonged heating of the polymerized product subsequent to said distillation, hydrogenation of the residual resinous product, and any other modifications evident to one skilled in the art in the light of the disclosure and discussion herein. For example, if the heating is discontinued immediately subsequent to the occurrence of a sharp decrease in the temperature of the distillation vapors, i. e. where the unpolymerized anhydride material has been substantially completely distilled from the polymer-containing mixture, the product is yellow or amber colored. However, if prior to said distillation the boiling mixture is held under total reflux for a period of 1 hour or longer, the product instead of being adhesive and yellow or amber colored is darker in color and harder and more brittle. If heating is prolonged subsequent to the said sharp decrease in temperature, the product becomes harder and darker in color and in some instances, finally a deep brown. Similarly, with continued heating of the resinous residual product over a prolonged period, the hardness increases and in some instances, the materials comprise clear glassy solids upon cooling and become brittle.

Holding the boiling mixture under total reflux prior to the distillation thereof comprises a means of conducting the polymerization at a relatively constant elevated temperature for a period prior to distillation of unpolymerized starting anhydride from the polymer-containing mixture. By holding the boiling mixture under total reflux as above described, a resinous product of increasing hardness, and darker in color can be obtained. The polymerization, however, can be conducted by heating the anhydride under total reflux for a period and removing the unpolymerized anhydride from the polymer-containing mixture by a means other than the distillation hereinbefore described. For example, the unpolymerized portion can be removed from the polymer-containing mixture by means of a flash distillation.

However, we prefer the stepwise distillation method with modifications such as those herein described, if desired.

The resinous materials of our invention are unsaturated compounds and can be hydrogenated in accordance with conventional procedures. By means of hydrogenation our resinous materials are made considerably harder, thus adapting them to still broader applications. We have conducted the hydrogenation of our product in the presence of known hydrogenation catalysts, such as molybdenum sulfide, nickel, etc., at temperatures in the range of from 300–750° F., at pressures in the range of 500–2000 p. s. i., and at contact times of from 1 to 4 or more hours. We prefer to place the unhydrogenated material in solution with a suitable solvent such as, for example, dioxane. However, when the hydrogenated material exists as a liquid under the conditions of hydrogenation, a solvent may be unnecessary. We have dissolved our resinous product in dioxane in concentrations in the range of 5–20 per cent by weight. It is evident, however, that any concentration of our resinous material in a solvent is satisfactory for hydrogenation so long as a fluid mixture is maintained at the temperature and pressure conditions of the hydrogenation. As a result of hydrogenation, we obtain resinous materials having a degree of hardness considerably greater than that exhibited prior to hydrogenation. Upon further hydrogenation of the once hydrogenated resinous product we obtain resinous materials of still greater hardness.

In one embodiment of our invention we polymerize the anhydride starting material by heating it at a temperature within the limits of 520 and 800° F. for a period of from 1 to 4 hours, while simultaneously distilling the unpolymerized anhydride from the resulting polymer-containing mixture until all unpolymerized anhydride is recovered as an overhead distillation product. The residual distillation product comprising a tetrahydrophthalic anhydride resin is then contacted with hydrogen in the presence of a suitable hydrogenation catalyst at a temperature within the limits of 300 and 750° F. at a pressure in the range of 1000 to 1500 p. s. i., for a duration of from 1 to 4 hours. The hydrogenated resin product thus formed is then further heated at a temperature within the limits of about 200 and 800° F. for a period of from 1 to 4 hours, and then rehydrogenated under the same conditions of temperature, pressure, and catalyst, as employed during the hydrogenation immediately described above, to provide a hard resinous polymeric product of our process.

Our invention operates separately or in combination with one, several, or all the modifications or embodiments described hereinbefore. It is understood that our invention is not necessarily limited to the various modifications described since it is evident that it would be operable with other modifications not described but apparent in the light of the disclosure and discussion herein. The operation of our invention and the choice of various combinations of the aforesaid modifications and a choice of the specific anhydride provides for the preparation of novel resinous materials of numerous types, varying in hardness from soft and adhesive materials to materials of extreme hardness, in color from light to dark, and in a state of clearness varying from opacity to transparency.

Our invention is applicable to both batch type and continuous flow type operation. For example, when conducting a batch type operation of our process, the anhydride is charged to a fractionator, heated at the boiling point and distilled, in accordance with the procedure aforedescribed. When conducting a continuous flow type operation of our process, the anhydride is charged to a fractionating column and the distillation initiated. Subsequent to initial distillation of the boiling anhydride, additional anhydride is continuously charged to the fractionating column at a point in the rectifying section, preferably near or at the center. The conditions of temperature and pressure are such that polymerization of the anhydride progresses immediately subsequent to its being charged. Polymer thus formed passes to the kettle and the unpolymerized anhydride leaves the fractionator as the overhead product. The kettle product, a liquid at the temperature and pressure conditions, of the distillation is removed continuously. The overhead product, supplemented with fresh feed is returned to the fractionator and the process continued. Continuous operation utilizing a tube coil, as previously discussed, may also be practiced.

The hardness range of our novel resinous products is greater than that of many known resinous polyesters. The hardness of the product is a function of the heating time subsequent to polymerization, periods of as high as 8 hours or more subsequent to the distillation step sometimes being utilized. For example, in the preparation of adhesives, heating subsequent to said distillation is prolonged to periods as long as 1 hour; for use in the preparation of inks, heating may be prolonged over a period varying from 1 to 4 hours, and for use in the manufacture of flooring materials, heating is prolonged for periods varying from 4 to 8 hours or longer. Prolonged heating may be minimized, if desired, by holding the boiling reaction mixture under total reflux prior to distillation of the unpolymerized anhydride therefrom. Resinous materials considerably harder and in many instances otherwise similar in properties to the products of prolonged heating, are obtained upon hydrogenation of the aforesaid materials. Hydrogenated products can be utilized in the preparation of harder materials such as tile products, etc.

Our products are slightly soluble in benzene and dissolve completely in acetone or ether. By dissolving the resinous materials in relatively large volumes of ether, small amounts of impurities comprising principally unchanged anhydride material, remain undissolved and can be separated, thus providing a substantially pure product subsequent to vaporization of the solvent. Ether solutions of our products remain fluid until substantially all the ether has been evaporated; the concentrated, viscous solutions of the resinous polymer product provided thereby are highly adhesive in nature and comprise a source for the manufacture of adhesives.

This invention is concerned with resinous materials prepared from tetrahydrophthalic anhydride, or substitution products thereof, as the anhydride. Although any suitable source of the anhydride is adequate, we have preferred to employ an anhydride resulting from condensation of maleic anhydride and a conjugated diolefin. Condensation of maleic anhydride with compounds having a system of conjugated double bonds is well known and provides a source for the anhydride employed herein; for example, maleic anhydride reacts readily and quantitatively with 1,3-butadiene, isoprene, chloroprene, cyclopentadiene, cyclohexadiene, piperylene, and the like, to form an anhydride material which is represented by the structural formula described hereinbefore. The diolefin is heated with maleic anhydride until the reaction is completed. The product is cooled and the crystalline product comprising the anhydride is separated. When the anhydride is prepared in this manner it is desirable that unchanged reactants be removed prior to its application in the preparation of the resinous materials of the invention.

The molecular structure of our novel resinous polymer product is not known to us although it is suggested as being in accordance with the following mechanisms. However, it is to be understood that the novel resinous products of this invention are not to be limited thereto. It is possible that the formation of our products progresses in accordance with the following mechanisms which would show continuous additions of the anhydride group to the double bonds as exhibited by Mechanism I, or the addition of two molecules of the anhydride to their double bonds and subsequent addition of the anhydride group to double bonds of succeeding molecules of anhydride as exhibited by Mechanism II.

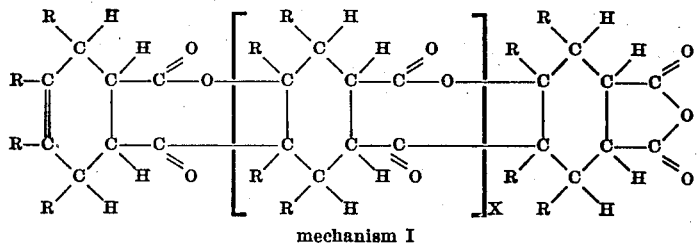

mechanism I

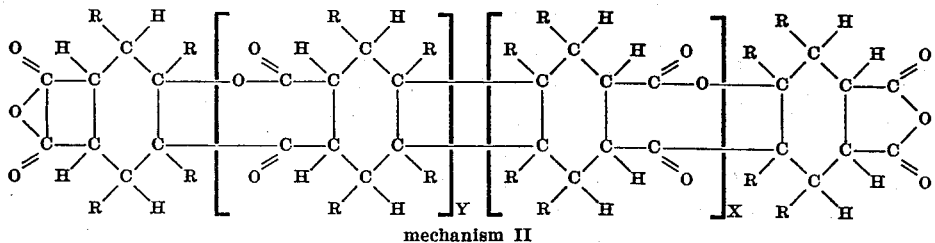

mechanism II

Either or both X or Y may be zero, but the sum of X and Y must not exceed 10. It may be that the reaction progresses in accordance with both possibilities thereby providing a mixture of the two possible type polymers illustrated. The mechanisms above illustrate the possibility of producing a polymer of each type ranging from a dimer to a polymer comprising 12 molecules of the anhydride.

In the following examples, the anhydride materials comprise those prepared from maleic anhydride and the following diolefin compounds: 1,3-butadiene, isoprene, chloroprene, and 1,3 pentadiene, and are tetrahydrophthalic anhydride, 4-methyl tetrahydrophthalic anhydride, 4-chloro tetrahydrophthalic anhydride, and 3 - methyltetrahydrophthalic anhydride, respectively. Although the examples are limited to the above mentioned condensation products or anhydrides, it is to be understood that the invention is not limited thereto since the resinous products of our invention and their preparation relate to all anhydrides of the general structural formula given hereinbefore as representative of our anhydride.

Advantages of this invention are illustrated by the following examples. The reactants, and their proportions, and other specific ingredients are presented as being typical and should not be construed to limit the invention unduly.

*Example I*

200 cc. of tetrahydrophthalic anhydride was placed in a distilling flask and heated at the boiling point, at atmospheric pressure, and simultaneously distilled at an overhead temperature varying from 515–530° F. After about 72 per cent of the anhydride had been distilled overhead, the vapor distillate temperature dropped sharply with no further distillation taking place. The residual high-boiling product, comprising 28 per cent by weight of the original anhydride was resinous and very adhesive.

The distillate of the initial heating-distillation step, comprising unpolymerized tetrahydrophthalic anhydride, was reheated at its boiling point and distilled at an overhead vapor temperature varying from 515–530° F.

The residual high-boiling product yield was about 28 per cent by weight of the reheated distillate, and was resinous and very adhesive. Subsequent to the distillation, the product was heated for 20 minutes at a temperature of about 600° F. A translucent product clearer and harder than that of the initial heating-distillation step was obtained.

The bromine number of the desired resinous product obtained as the distillation residue was found to be 36. The theoretical value for tetrahydrophthalic anhydride is about 90. Bromine number is defined as gram bromine that will react with 100 grams of sample.

*Example II*

100 grams of 4-methyl tetrahydrophthalic anhydride, prepared from maleic anhydride and isoprene, was heated at the boiling point and held under total reflux for 3 hours. Upon subsequent distillation, 51 grams of clear, light yellow, viscous resin was obtained. Vapor temperatures were in the range of 518–536° F. Upon further heating for about 20 minutes the product was slightly darker and showed very little change in hardness.

*Example III*

4-chloro tetrahydrophthalic anhydride, prepared from chloroprene and maleic anhydride, was heated at the boiling point under total reflux for 3 hours. Vapor temperatures were in the range of 545–554° F. Upon subsequent distillation of the unpolymerized 4-chloro tetrahydrophthalic anhydride from the polymer-containing mixture, a brown, resinous material was obtained, in a yield of 42 per cent by weight of the 4-chloro-tetrahydrophthalic anhydride initially heated.

*Example IV*

3-methyl tetrahydrophthalic anhydride prepared from 1,3-pentadiene and maleic anhydride, was heated at the boiling point, and unpolymerized 3-methyl tetrahydrophthalic anhydride was simultaneously distilled from the polymer-containing mixture at an overhead temperature of 527–540° F. After about 30 per cent of the anhydride reactant material had been distilled overhead, the overhead temperature dropped sharply, with no further distillation taking place. The residual, high-boiling portion comprised about 70 per cent by weight of the anhydride initially heated, and was a dark-colored, viscous product.

*Example V*

30 grams of the resinous polymeric material prepared from tetrahydrophthalic anhydride in Example I, was dissolved in 300 cc. of dioxane and hydrogenated at a temperature varying from 392-414° F., at a pressure of 1500 p. s. i. for 5 hours in the presence of a molybdenum sulfide catalyst. After removal of the dioxane by distillation, the residual product was heated at 212° F. for 4 hours. A resinous material considerably harder but otherwise similar in properties to the unhydrogenated product was obtained.

*Example VI*

A portion of the hydrogenated resinous material of Example V was dissolved in dioxane to comprise a 10 per cent solution and contacted with hydrogen for a period of 6 hours, at a pressure in the range of 1490-1840 p. s. i., and at a temperature in the range of 550-606° F. The dioxane was removed by distillation and the residual product was heated for 4 hours at about 400° F. The final product was a dark-colored, very hard, resinous material.

As will be evident to those skilled in the art, various modifications of this invention can be made, or followed, in the light of the foregoing disclosure and discussion, without departing from the spirit or scope of the disclosure or from the scope of the claims.

We claim:

1. A process for preparing a resinous polymeric material, comprising heating a reactant material consisting of tetrahydrophthalic anhydride at a constantly increasing boiling temperature within the range of 520 to 800° F. and simultaneously removing therefrom vapors of unreacted tetrahydrophthalic anhydride, subsequently heating the resulting residual polymeric product at a temperature within the range of 520 to 800° F. for a period of at least 20 minutes and not exceeding 8 hours, and recovering a resulting residual resinous polymer as a product of the process.

2. A process for the preparation of a hard resinous polymeric material, comprising polymerizing a reactant material consisting essentially of tetrahydrophthalic anhydride by heating same at a temperature within the range of 520 to 800° F. for a period of from 1 to 4 hours, removing unreacted tetrahydrophthalic anhydride from the resulting reaction mixture, recovering residual product and contacting same with hydrogen in the presence of a hydrogenation catalyst at a temperature within the range of 300 to 750° F. at a pressure in the range of 1000 to 1500 p. s. i., for a time of from 1 to 4 hours, and recovering a hard resinous polymeric material of said hydrogenating as a product of the process.

3. A process for the preparation of a hard resinous polymeric material comprising polymerizing a material consisting essentially of tetrahydrophthalic anhydride by heating same at a temperature within the range of 520 to 800° F. for a period of from 1 to 4 hours and simultaneously distilling unpolymerized anhydride from the resulting polymer-containing mixture until all said unpolymerized anhydride is removed therefrom, contacting residual distillation product with hydrogen in the presence of a hydrogenation catalyst at a temperature within the range of 300 to 750° F. at a pressure within the range of 1000 to 1500 p. s. i., for a duration of from 1 to 4 hours, heating product of said hydrogenating at a temperature within the range of from 200 to 800° F. for a period of from 1 to 4 hours, hydrogenating residual product thus heated under hydrogenation conditions of temperature, pressure, and catalyst, as above described, and recovering from the last said hydrogenating a hard resinous polymeric material as a product of the process.

4. A process for the preparation of a resinous polymeric product, comprising polymerizing from 20 to 70 percent of a reactant material consisting essentially of an anhydride having the structural formula:

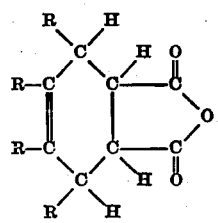

where each R is one of the group consisting of hydrogen, chlorine, and alkyl, with not more than two R's being chlorine, and with not more than 13 carbon atoms per molecule of said anhydride, by heating said reactant material as a liquid at a temperature within the range of 520 to 800° F., for a time within the limits of 1 and 4 hours and recovering a resinous polymeric material from the resulting reaction mixture as a product of the process.

5. The process of claim 4 wherein the recovered resinous polymeric material is hydrogenated to produce a hydrogenated resinous product.

6. A process for preparing a resinous polymeric material comprising polymerizing from 20 to 70 percent of a reactant material consisting essentially of tetrahydrophthalic anhydride by heating same as a liquid at a temperature within the range of 520 to 800° F. for a period of from 1 to 4 hours, and recovering from the resulting reaction mixture a resinous polymeric material as a product of the process.

7. A process for preparing a resinous polymeric material comprising polymerizing from 20 to 70 percent of a reactant material consisting essentially of 3-methyl tetrahydrophthalic anhydride by heating same as a liquid at a temperature within the range of 520 to 800° F. for a period of from 1 to 4 hours, and recovering from the resulting reaction mixture a resinous polymeric material as a product of the process.

8. A process for preparing a resinous polymeric material comprising polymerizing from 20 to 70 percent of a reactant material consisting essentially of 4-methyl tetrahydrophthalic anhydride by heating same as a liquid at a temperature within the range of 520 to 800° F. for a period of from 1 to 4 hours, and recovering from the resulting reaction mixture a resinous polymeric material as a product of the process.

9. A process for preparing a resinous polymeric material comprising polymerizing from 20 to 70 percent of a reactant material consisting essentially of 4-chloro tetrahydrophthalic anhydride by heating same as a liquid at a temperature within the range of 520 to 800° F. for a period of from 1 to 4 hours, and recovering from the resulting reaction mixture a resinous polymeric material as a product of the process.

10. The process of claim 4 wherein said reactant material is maintained at a boiling temperature and is simultaneously distilled to remove unreacted anhydride from the boiling liquid.

11. The process of claim 4 wherein said resinous polymeric material thus recovered is further heated at a temperature within the range of 520 to 800° F. for a period of from 20 minutes to 8 hours to increase the hardness of said polymeric material.

JOHN W. McCASLIN.
JOHN C. HILLYER.

REFERENCES CITED

The following references are of record in the file of this patent:

UNITED STATES PATENTS

| Number | Name | Date |
|---|---|---|
| 1,860,730 | Brooks et al. | May 31, 1932 |
| 2,359,038 | Hopff et al. | Sept. 26, 1944 |

OTHER REFERENCES

Beilstein, Handbuch der organischen Chemie, vol. 17, page 462 (1933).